United States Patent [19]

Kirchmeyer et al.

[11] Patent Number: 5,266,405
[45] Date of Patent: Nov. 30, 1993

[54] THERMOSETTING COMPOSITIONS FOR THE PRODUCTION OF LIQUID-CRYSTALLINE EPOXIDE NETWORKS, A PROCESS FOR THEIR PREPARATION AND THEIR USE

[75] Inventors: Stephan Kirchmeyer, Leverkusen; Hanns P. Müller, Gladbach; Alexander Karbach, Krefeld; Joachim Franke, Cologne, all of Fed. Rep. of Germany

[73] Assignee: Bayer Aktiengesellschaft, Leverkusen

[21] Appl. No.: 733,706

[22] Filed: Jul. 22, 1991

[30] Foreign Application Priority Data

Aug. 1, 1990 [DE] Fed. Rep. of Germany ....... 4024375
Dec. 18, 1990 [DE] Fed. Rep. of Germany ....... 4040471

[51] Int. Cl.$^5$ ............... C08G 59/24; C08G 59/50; G02F 1/35; C08L 63/00
[52] U.S. Cl. .................... 428/413; 523/466; 523/468; 525/423; 526/273; 528/99; 528/100; 528/101; 528/102; 528/107; 528/109; 528/111; 528/113; 528/114; 528/120; 528/123; 528/124

[58] Field of Search .............. 528/99, 100, 101, 109, 528/111, 123, 124, 120, 102, 107, 114, 113; 428/413; 523/468, 466; 525/423; 526/273

[56] References Cited

U.S. PATENT DOCUMENTS

| 3,383,360 | 5/1968 | Harrison | 528/99 |
| 4,153,621 | 5/1979 | Hartmann | 528/87 |
| 4,764,581 | 8/1988 | Muller et al. | 528/100 |
| 5,077,380 | 12/1991 | Hefner et al. | 526/262 |

FOREIGN PATENT DOCUMENTS

| 0252359 | 1/1988 | European Pat. Off. . |
| 0363237 | 4/1990 | European Pat. Off. . |

OTHER PUBLICATIONS

Kirchmeyer et al., Applied Macromolecular Chemistry and Physics, Band 185/186, Feb. 1991, pp. 33–42.

*Primary Examiner*—Frederick Krass
*Attorney, Agent, or Firm*—Connolly & Hutz

[57] ABSTRACT

This invention relates to thermosetting compositions for the production of epoxide networks of very high impact strength, to a process for their preparation and to their use as polymer materials, coating compounds, adhesives and materials for electrical insulation.

5 Claims, No Drawings

THERMOSETTING COMPOSITIONS FOR THE PRODUCTION OF LIQUID-CRYSTALLINE EPOXIDE NETWORKS, A PROCESS FOR THEIR PREPARATION AND THEIR USE

This invention relates to thermosetting compositions for the production of epoxide networks of high impact strength, to these epoxide networks, to a process for their preparation and to their use as polymer materials, coating compounds, adhesives or materials for electrical insulation, optionally in combination with mineral fillers or in combination with glass fibres, carbon fibres or aramide fibres or woven or knitted fabrics or nonwoven webs thereof for the production of high performance composites.

Whereas liquid crystalline properties give rise to a so-called self reinforcement in thermoplastic polymers and are already utilized commercially, only a few works have been disclosed concerning liquid crystalline properties in highly cross-linked duroplasts.

The curing of duroplastic materials may be carried out in the liquid crystalline state and the liquid crystalline (LC) properties of the network-forming chemical units or those of an LC intermediate formed during the curing reaction may be utilized for this purpose. Superstructures are thereby produced in the cured solid substance.

DE 36 22 613, for example, describes a process by which epoxide networks having superstructures may be prepared. In this process, the network is built up within the LC temperature range of at least one of the components used for the synthesis.

According to DE 40 07 056, on the other hand, epoxide networks having superstructures may also obtained if none of the components has LC properties but an LC intermediate is formed during curing.

All these works reveal that the network forming units have common structural features already known from LC thermoplasts. They have a rigid, rod-shaped geometry without a kink. Para-disubstituted aromatic rings, 4,4'-disubstituted biphenyls, 4,4'-disubstituted benzoic acid phenyl esters and heterocyclic analogues thereof are characteristic. Structures of rigid, rod-shaped units, which are particularly suitable, for example, for LC polyamides and LC polyesters, are described, for example, by R. W. Lenz in "Synthetic Routes to Liquid Crystalline Polymers" [R. W. Lenz in L. L. Chapoy, "Recent Advances in Liquid Crystalline Polymers", Elsevier Applied Science Publishers LTD (1985), London, N.Y.]. These units are also particularly suitable for the production of superstructures in duroplastic networks.

Units having a kinked structure are also added to liquid crystalline polymers to improve the processing properties, in particular the solubility as well as the fusibility, which is so important for thermoplasts. These polymers are added although it is known that the improvements are obtained at the expense of the mechanical and liquid crystalline properties.

Nothing has hitherto been disclosed concerning the use of kinked units in duroplastic epoxide networks having superstructures. Many technically commonly used diamine hardeners for epoxide resins have relatively rigid although kinked structures, but in no circumstances have epoxide networks with superstructures hitherto been obtainable from these technically commonly used diamine hardeners, even in combination with epoxide monomers having a rigid, linear structure.

It was therefore completely surprising to the man skilled in the art that epoxide networks having superstructures could be produced precisely from the diamine hardeners with a kinked structure used according to the invention.

Neither from theoretical considerations nor from chemical intuition can the man of the art find any reason why the mechanical properties of the networks according to the invention should be more than marginally superior to those of previously known networks having superstructures.

It is surprisingly found that the epoxide networks with superstructures according to the invention have unexpectedly high impact strength amounting to three to four times that of conventional epoxide networks and more than twice that of previously known networks having a superstructure. The reason why this finding is so unexpected and unforeseeable to the man of the art is that in contrast to thermoplasts, in which the properties of the monomers are of great importance, the network properties in networks are fundamentally determined by the network topology.

It was also surprising that the high values for impact strength are not accompanied by a reduction in mechanical strength (tensile strength and flexural strength) and in dimensional stability under heat, which are very high. The frequently observed, so-called "plasticizer effect" therefore does not exist in this case.

Lastly, it is surprisingly found that the hardenable mixtures according to the invention may be converted by heat treatment into solid or highly viscous intermediate products, so-called B states, which in contrast to the usual hardenable technical mixtures based on epoxides do not undergo further reaction at room temperature.

The present invention thus relates to thermosetting compositions suitable for the production of epoxide networks, optionally having a superstructure and having high impact strength, consisting of a) an epoxide group-containing component corresponding to formula (I)

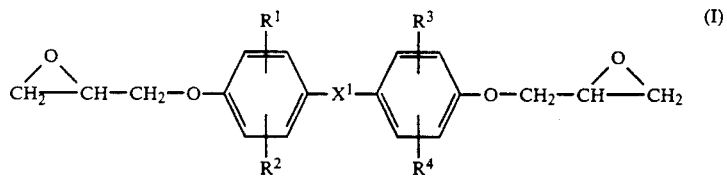

wherein
R$^1$, R$^2$, R$^3$ and R$^4$ denote, independently of one another, hydrogen or straight chained or branched C$_1$ to C$_{12}$-alkyl in which the carbon atoms may be interrupted 1 to 3 times by ether oxygen, or they denote fluorine, chlorine, bromine, cyano or trifluoromethyl, and $X^1$ stands for $-CH_2-CH_2-$, $-CH(CH_3)-CH_2-$,

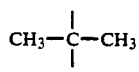

$-CO-O-$, $-O-CO-$, $-CH=CH-$, $-N=N-$, $-CH=C(CH_3)-$, $-CH=N-$, $-O-CH_2-$, $-CH_2-O-$, $-CH_2S-$, $-N=CH-$, $-CO-S-$ or $-S-CO-$ or for a direct bond between the aromatic nuclei, b) an epoxide reactive component corresponding to formula (II)

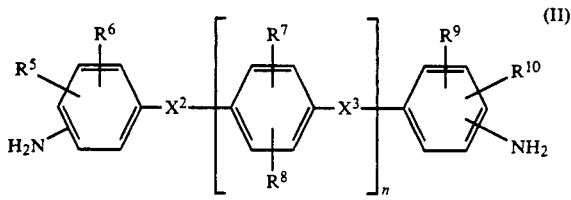

wherein $R^5$ to $R^{10}$ have the range of meanings of $R^1$ to $R^4$ independently of one another and independently of $R^1$ to $R^4$, $X^2$ and $X^3$ have the range of meanings of $X^1$ independently of $X^1$ and independently of one another, n stands for 0 or 1 and the two amino groups are in the meta- or para-position and at least one of the two amino groups must be in the meta-position to group $X^2$ or $X^3$ and c) optionally other additives.

The invention further relates to a process for the production of epoxide networks, optionally having a superstructure and having high impact strength, characterised in that a thermosetting composition according to claim 1 consisting of a) an epoxide group-containing component corresponding to formula (I),
b) an epoxide-reactive component corresponding to formula (II) and
c) optionally further additives is reacted in the temperature range of from 60° to 250° C., preferably from 80° to 160° C., and curing is optionally interrupted by cooling to below 60° C. and continued at later point in time by reheating to a temperature of from 60° to 250° C., optionally with a process for imparting form or changing form interposed in the interval.

Lastly, the invention relates to the use of the polymer epoxide networks according to claim 3 optionally having a superstructure and having high impact strength, as polymer materials or as coating compounds and to the use of the thermosetting compositions according to claim 1 in combination with glass fibres, C-fibres or aramide fibres for the production of high performance composites.

Component a) may be reacted in the form of a single compound corresponding to formula (I) or in the form of a mixture of several compounds corresponding to formula (I).

When the compound corresponding to formula (Ia)

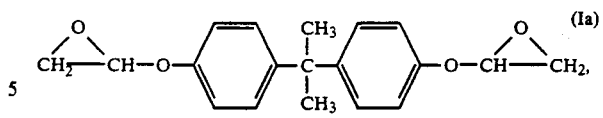

is used alone as component a), networks are obtained without a superstructure.

Component a) preferably consists of at least one of the following compounds: 4-Epoxy-propoxyphenyl-4-epoxypropoxybenzoate, 4,4'-bis-(epoxypropoxy)-α-methylstilbene, 4,4'-bis-(epoxypropoxy)-biphenyl and 4,4'-bis-(epoxypropoxy)-biphenyl.

According to the invention, component a), which is reacted in the form of at least one compound corresponding to the above formula (I), may be mixed with other compounds containing epoxide groups.

The compounds mixed with component a) may be aliphatic, cycloaliphatic, aromatic or heterocyclic compounds having epoxide groups which are known per se and commonly used in technology. Such compounds may contain one, two or more epoxide groups per molecule. The aliphatic compounds which form the basis of the epoxide group-containing compounds used in admixture with component a) have 1 to 20 carbon atoms and consist of epoxidizable carboxylic acids, carboxylic acid anhydrides, alcohols, dihydric alcohols, polyalcohols or unsaturated compounds. The epoxidizable cycloaliphatic compounds have rings with 3 to 7 carbon atoms, preferably 5 or 6 carbon atoms, which in turn may carry up to 3 methyl or ethyl groups and may in addition contain functional groups of the kind which include them in the above-mentioned classes of compounds.

The aromatic compounds used may be phenols, polyphenols, carboxylic acids, polycarboxylic acids, hydroxycarboxylic acids, aromatic amines or aromatic polyamines having a benzene or naphthalene nucleus as their basic structure. Such aromatic compounds also include those whose basic structure is composed of two benzene nuclei linked together by a single bond, by a $C_1-C_6$-alkylene group, by a $C_2-C_6$-alkylidene group, by a $C_5-C_6$-cycloalkylene group, by a $C_5-C_6$-cycloalkylidene group or by oxygen, sulphur, $SO_2$ or CO.

The basic structure for epoxidizable heterocyclic compounds may be aromatic or non-aromatic 5-membered or 6-membered rings having one or two nitrogen, oxygen or sulphur atoms and carrying hydroxyl, carboxyl or amino groups for epoxidation.

The following are examples of such compounds suitable for mixing with component a): Polyglycidyl ethers of polyvalent phenols, for example of pyrocatechol, resorcinol, hydroquinone, 4,4'-dihydroxy-diphenyl-dimethylmethane, 4,4'-dihydroxy-diphenyl-cyclohexane, 4,4'-dihydroxy-3,3'-dimethyl-diphenylpropane, 4,4'-dihydroxy-diphenylsulphone, tris-(4-hydroxyphenyl)-methane, polyglycidyl ethers of chlorination and bromination products of the above-mentioned polyphenols, of Novolaks (reaction products of monovalent or polyvalent phenols with aldehydes, in particular formaldehyde, in the presence of acid catalysts), of diphenols obtained by the esterification of 2 mol of the sodium salt of an aromatic hydroxycarboxylic acid with 1 mol of a dihalogenated alkane or dihalogenated dialkylether (GB 1 017 612), or of polyphenols obtained by the condensation of phenols and long chained halogenated paraffins having at least two halogen atoms (GB 1 024 288);

Phenyl-epoxide compounds based on aromatic amines and epichlorohydrin, for example N-di-(2,3-epoxy-propyl)aniline, N,N'-dimethyl-N,N'-diepoxypropyl-4,4'-diamino-diphenylmethane, N-di-epoxypropyl-4-aminophenyl-glycidyl ether (GB 772 830 and GB 816 923); glycidyl esters of polybasic aromatic, aliphatic and cycloaliphatic carboxylic acids, such as phthalic acid diglycidyl ester, adipic acid diglycidyl ester and glycidyl esters of reaction products of 1 mol of an aromatic or cycloaliphatic dicarboxylic acid anhydride and ½ mol of a diol or 1/n mol of a polyol having n hydroxyl groups (n=2-6) or hexahydrophthalic acid glycidyl esters optionally substituted with methyl groups; glycidyl ethers of polyhydric alcohols, for example of 1,4-butanediol, glycerol, trimethylolpropane, pentaerythritol and polyethylene glycols; other glycidyl compounds, such as triglycidyl-isocyanurate, N,N-diepoxypropyl-oxamide, polyglycidyl thioethers of polyvalent thiols, such as bis-mercaptomethyl-benzene, diglycidyl-trimethylene-trisulphone, and polyglycidylethers based on hydantoins; epoxidation products of unsaturated or polyunsaturated (cyclo)aliphatic compounds such as vegetable oils and their conversion products, epoxidation products of di- and polyolefins such as butadiene, vinyl cyclohexene, 1,5-cyclooctadiene, 1,5,9-cyclododecatriene, polymers and copolymers still containing epoxidizable double bonds, for example those based on butadiene, polyisoprene or butadiene-styrene copolymers, divinylbenzene dicyclopentadiene and unsaturated polyesters; epoxidation products of olefins obtainable by Diels-Alder addition and subsequently converted into polyepoxides by epoxidation with per compounds; or epoxidation products of compounds containing two cyclopentene or cyclohexene rings linked together by bridging atoms or bridging atomic groups of the type mentioned above; also, polymers of unsaturated monoepoxides, for example of methacrylic acid glycidyl esters or allyl glycidyl ethers.

One or more compounds from the following group are preferably used for mixing with component a): Polyglycidyl ethers of polyvalent phenols, in particular of bis-phenol A; polyepoxide compounds based on aromatic amines, ion particular bis(N-epoxypropyl)-aniline, N,N'-dimethyl-N,N'-diepoxypropyl-4,4'-diaminodiphenylmethane and N-diepoxypropyl-4-amino-phenylglycidylether; polyglycidyl esters of cycloaliphatic dicarboxylic acids, in particular hexahydrophthalic acid diglycidyl ester; polyepoxides of the reaction product of n mol of hexahydrophthalic acid anhydride and 1 mol of a polyol having n hydroxyl groups (n denotes an integer with a value from 2 to 6), in particular 3 mol of hexahydrophthalic acid anhydride and 1 mol of 1,1,1-trimethylolpropane; 3,4-epoxy-cyclohexyl-methyl-3,4-epoxycyclohexane carboxylate.

It is particularly advantageous to use liquid polyepoxides such as bis(N-epoxypropyl)-aniline or vinylcyclohexene-diepoxide. This may in some cases further reduce the viscosity of polyepoxides which are already liquid or convert solid polyepoxides into liquid mixtures.

In the mixture of component a) with the above mentioned epoxide compounds suitable for use with component a), component a) amounts to 50 to 100 mol-%; preferably 70 to 100 mol-%, most preferably 85 to 100 mol-% and particularly 95 to 100 mol-% of the total mixture. This nomenclature therefore also covers the reaction of component a) not mixed with any other epoxide compounds.

Component b) includes compounds corresponding to formula (II) which may be reacted either as a single compound or in the form of a mixture of several compounds corresponding to formula (II).

Component b) preferably contains at least one compound corresponding to formula (III)

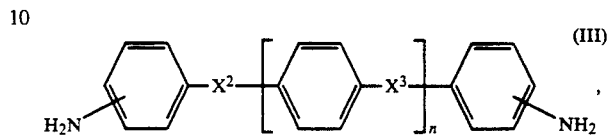

wherein
$X^2$ and $X^3$ have the range of meanings indicated above and
n stands for 0 or 1,
the two amino groups are arranged in the meta- or para-positions and at least one of the two amino groups must be arranged in the meta-position to group $X^2$ or $X_3$.

It is particularly preferred to use at least one compound corresponding to formula (IV), (V) or (VI)

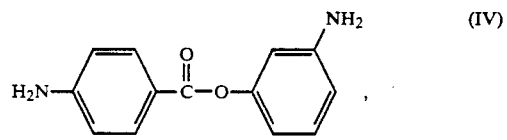

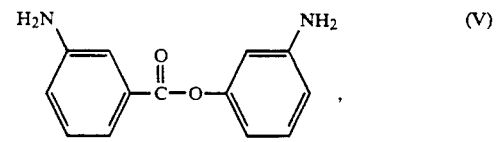

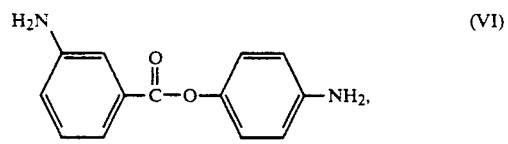

for reaction as component b)

Component b) may be mixed with one or more functional, epoxide-reactive compounds corresponding to formula (VII)

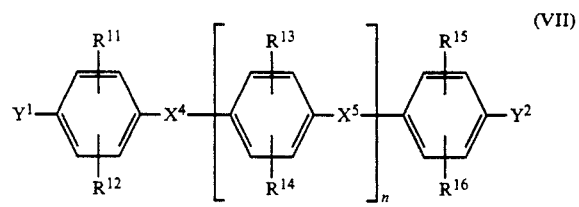

wherein
$R^{11}$ to $R^{16}$ have the meanings covered by $R^1$ to $R^4$, independently of one another and independently of $R^1$ to $R^4$,
$X^4$ and $R^5$ have the meanings of $X^1$, independently of one another and independently of $X^1$,
n stands for 0 or 1 and
$Y^1$ and $Y^2$ denote, independently of one another, OH, $NH_2$ or $NH-C_1-C_4$-alkyl.

Component b) is preferably mixed with at least one compound corresponding to the following formula

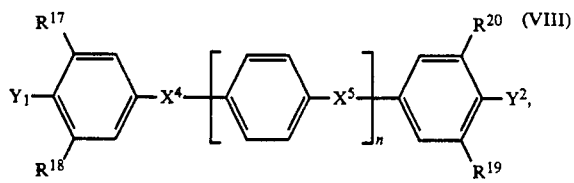

wherein
$R^{17}$ to $R^{20}$ have the range of meanings of $R^1$ to $R^4$ independently of one another and independently of $R^1$ to $R^4$,
$X^4$, $X^5$, $Y^1$ and $Y^2$ have the range of meanings indicated above and
n stands for 0 or 1.

It is particularly preferred to use at least one compound from the following group of compounds as component b) of the mixture:

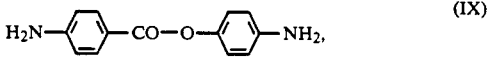

These compounds are described in DE 40 07 056. In the mixture of component b) with compounds corresponding to the general formula (VII), component b) amounts to 50 to 100 mol-%, preferably 80 to 100 mol-%, most preferably 95 to 100 mol-% of the total mixture. This nomenclature therefore also covers the reaction of component b) not mixed with any other component.

Component b) or the mixture of component b) with one or more compounds corresponding to formula (VII) may be mixed in a manner similar to that described above for component a) with a polyfunctional amine, a polyfunctional phenol or an epoxide hardener or a mixture of several of these compounds, as known per se and conventionally used industrially. Such compounds suitable for mixing with component b) or with a mixture of component b) and one or more compounds corresponding to formula (VII) are known to the man skilled in the art, for example from "Polymere Werkstoffe", published by H. Batzer, Volume III, Technologie 2, Georg Thieme Verlag, Stuttgart 1984, pages 170 et seq, and "Methoden der organischen Chemie" (Houben-Weyl), Volume E 20 (Makromolekulare Stoffe), Georg Thieme Verlag, Stuttgart, N.Y. 1987, pages 1965 et seq and pages 1976 et seq.

Examples of these compounds include polyfunctional amines such as diethylene triamine, m-phenylene diamine, 4,4'-diaminodiphenylsulphone and 4,4'-diaminodiphenylmethane. Epoxide hardeners conventionally used industrially which are suitable for mixing with component b) include tertiary amines such as benzyl dimethylamine, 2-(dimethylaminomethyl)-phenol, 2,4,6-tris(dimethylaminomethyl)-phenol, triethanolamine, alcoholates and imidazoles such as N-n-butylimidazole.

When component b) or a mixture of component b) with one or more compounds corresponding to formula (VII) is present together with a polyfunctional amine, polyfunctional phenol or epoxide hardener or with a mixture of several of these, component b) or the mixture of component b) with one or more compounds corresponding to formula (VII) amounts to 50 to 100 mol-%, preferably 70 to 100 mol-%, more preferably 85 to 100 mol-% and most preferably . 95 to 100 mol-% of the total composition.

In the course of the curing reaction, the thermosetting mixtures according to the invention give rise in known manner to liquid crystalline intermediate products which lead to the formation of superstructures, i.e. the formation of multiphase networks in the hardened solid epoxide product.

The occurrence of these structures is recognised by the opaque change of the mixture of components a) and b) or of the above described mixtures of components a) and b) with other compounds. Such liquid crystalline structures are obtained in the known temperature ranges of from 60 to 180° C., preferably from 80° to 160° C., most preferably from 120° to 160° C. The most suitable range for such an opaque change depends, of course, on the required composition of the reaction mixture of components a) and b) or of mixtures thereof and may be determined by simple preliminary tests. After conversion into the solid epoxide substance, the multiphase condition can no longer be changed by a temperature treatment This method of procedure is known in principle and does not constitute a subject of the present invention. It is surprisingly found that when the thermosetting compositions according to the invention are used, multiphase, opaque epoxide moulded products which are distinguished by a severalfold increase in impact strength can be obtained.

The thermosetting process may be interrupted at any time by cooling to a temperature below 60° C., in particular after formation of the liquid crystalline state of the intermediate product C, and may be continued later. The point in time for interruption of the reaction is advantageously chosen so that the mixture obtained on cooling is in a solid state but becomes liquid again when subsequently heated to the final curing temperature in the abovementioned temperature range or can be shaped under pressure. The application of this process with interrupted curing is particularly advantageous when the products to be produced are laminated sheets, fibre reinforced prepegs, moulding compounds or coating compounds obtained, for example, by the whirl sintering process. This procedure is always advantageous if preparation of the preliminary products obtained at the stage of interrupted curing and their subsequent use are to take place at different localities and the final moulding process or change in shape is to be carried out later, by the user.

For the production of the polymer epoxide networks according to the invention with superstructure, components a) and b) (or mixtures thereof) are brought together in proportions corresponding to about one phenol group or one secondary amino group per epoxide group or one primary amino group for every two epoxide groups. This ratio of the mixture may be altered by up to 40 equivalents-% of the above-mentioned reactive groups as in conventional epoxide resins, preferably by up to 20 equivalents-% of component a) or b) (or mixtures thereof).

For the production of the polymeric epoxide networks with superstructure according to the invention, fillers such as powdered quartz, chalk, aluminium oxide, inorganic pigments such as titanium dioxide, iron oxide, organic pigments such as phthalocyanine pigments, flexibilizers such as polyglycols, polyether glycols, polyesters having terminal hydroxyl and/or carboxyl groups, polysulphides, soluble dyes, reinforcing materials such as glass fibres or woven fabrics, or plasticizers may be added in the quantities known from the chemistry of epoxide resins. Several of these additives may be used.

When epoxides derived from bisphenol-A are used alone, e.g. when 4,4'-bis-glycidyloxyphenyl-2,2-propane is used alone as component a) (corresponding to Formula Ia), the network structures which can be produced have no superstructure.

The polymer epoxide networks with superstructure according to the invention are distinguished from those without superstructure having the same thermal properties by increased mechanical strength and toughness. Insofar as this has not already been indicated above, they may be used as moulded casting resins, for example as constructional and insulating materials for insulators, transformers, capacitors, printed circuits and chips, and as laminated sheet products for pipes and containers for corrosive liquids, for sports equipment, for example for boat building, and for many other purposes.

The subject of the invention will now be illustrated with the aid of the following Examples.

EXAMPLE 1 3-Aminophenyl-4-aminobenzoate (IV)

306.19 g (1.65 mol) of 4-nitrobenzoyl chloride were introduced portionwise under a nitrogen atmosphere at room temperature into 229.35 g (1.65 mol) of 3-nitrophenol in 100 ml of anhydrous dimethylformamide and 143.75 g (1.82 mol) of pyridine and the reaction mixture was stirred for 4 hours at 60° C. It was then poured on 5 litres of ice water and suction filtered and the residue was dried at 60° C./20 mbar and recrystallised from ethyl acetate. 336.6 g (71% of the theoretical yield) of 3-nitrophenyl-4-nitrobenzoate were obtained.

300 g (1.04 mol) of this compound were dissolved in 2400 ml of dimethylformamide, 300 g or Raney nickel were added and the reaction solution was exhaustively hydrogenated under a hydrogen pressure of 70 bar at 60° C. The product was precipitated in 10 litres of water, sharply suction filtered, washed with water and dried at 40° C./20 mbar for 16 hours. 175.75 g (74% of the theoretical yield) of 3-aminophenyl-4-aminobenzoate melting at 179° to 182° C. were obtained.

EXAMPLE 2 3-Aminophenyl-3-aminobenzoate (V)

695.0 g (5.0 mol) of 3-nitrophenol, 927.5 g (5.0 mol) and 437.5 g (5.5 mol) of pyridine in 3000 ml of dimethylformamide were converted into 1236 g (86% of theoretical yield) of 3-nitrophenyl-3-aminobenzoate analogously to Example 1.

300 g (1.04 mol) of this compound were hydrogenated in 1500 ml of dimethylformamide with the addition of 30 g of Raney nickel as in Example 1 and worked up. 180.5 g (76% of the theoretical yield) of 3-aminophenyl-3-aminobenzoate melting at 102° C. were obtained.

EXAMPLE 3 Reaction of a thermosetting composition according to the invention and production of a liquid crystalline intermediate 15 g of 4-Glycidyloxyphenyl-4-glycidyloxybenzoate and 5 g of 3-aminophenyl-4-aminobenzoate (IV) are intimately mixed. A powder is obtained. 5 g Portions of this powder are introduced into various test tubes and immersed in an oil bath heated to 120° C. The test tubes are removed from the oil bath after 7 minutes (Sample 1), 10 minutes (Sample 2), 20 minutes (Sample 3) and 30 minutes (Sample 4). The contents of all the test tubes are liquid, transparent and homogeneous before cooling; Sample 4 is somewhat more viscous than the other samples. Sample 1 solidifies suddenly on cooling. When the cooling of a drop which is still hot is observed under a polarization microscope, it can be seen to undergo crystal growth. Sample 2 becomes opaque on cooling; it does not solidify but remains viscous and sticky. A drop of this sample shows liquid crystalline properties under the polarization microscope when heated to 40° C. Sample 3 becomes hard, opaque and vitreous on cooling. A drop of this sample shows liquid crystalline properties under the polarization microscope when heated to 100° C. Sample 4 becomes hard, opaque and vitreous on cooling like Sample 3 but remains liquid crystalline up to 130° C. Sample 4 is returned to the oil bath heated to 120° C. After a further 20 minutes, it has undergone cross-linking and appears opaque.

The experiment shows that while the mixtures according to the invention are being cured, a liquid crystalline intermediate product is indeed formed-in the course of the polyaddition reaction. The LC intermediate can be recognised by the opaque appearance of the sample. An LC intermediate can be converted into an opaque solid substance.

EXAMPLE 4 Production of an epoxide network with superstructures from the thermosetting compositions according to the invention 3.42 g of 4-Glycidyloxyphenyl-4-glycidyloxybenzoate and 1.14 g of 3-aminophenyl-4-aminobenzoate are mixed together and melted at 120° C. After 10 minutes, the clear, homogeneous melt is degasified by application of a vacuum and poured into small casting moulds. Inside these moulds, the samples are cured for 4 hours at 80° C. (Sample 1), 120° C. (Sample 2), 160° C. (Sample 3) and 180° C. (Sample 4). Samples 1 to 3 give rise to opaque moulded products while Sample 4 results in a transparent product. All of these moulded products are infusible and insoluble. The example demonstrates that networks with order structures are formed at a preferred temperature range of from 80° to 160° C. These structures are recognisable by their opaque appearance.

EXAMPLE 5 Production of an epoxide network having order structures from the thermosetting mixtures according to the invention 3.42 g each of 4-glycidyloxyphenyl-4-glycidyloxybenzoate and of 3-aminophenyl-3-aminobenzoate are mixed together and melted at 120° C. After 10 minutes, the clear, homogeneous melt is briefly degasified by application of a vacuum and poured into small casting moulds. The contents of these moulds are cured for 4 hours each at 80° C. (sample 1), 120° C. (sample 2) and 160° C. (sample 3). The mouldings from samples 1 and 2 have an opaque appearance, that from sample 3 is transparent. All the mouldings are infusible and insoluble. The Example shows that the most favourable temperature range for curing depends on the desired composition of components a) and b) and can be determined by simple preliminary tests.

EXAMPLE 6 Production of an epoxide network having order structures and high impact strength 240 g of 4-Glycidyloxyphenyl-4-glycidyloxybenzoate and 80 g of 3-aminophenyl-4-aminobenzoate are heated to 120° C. for 15 minutes, degasified and poured into a plate mould 4 mm in thickness which has been preheated to 120° C. The plate is cured for 4 hours at 120° C. and then tempered for 16 hours at 160° C. An opaque cast plate is obtained and its mechanical properties are determined.

COMPARISON EXAMPLE I (not according to the invention)

Production of an epoxide network having order structures without the use of the thermosetting compositions according to the invention 240 g of 4-Glycidyloxyphenyl-4-glycidyloxybenzoate and 80 g of 4-aminophenyl-4-aminobenzoate are worked up into a cast plate as in Example 6 but curing is carried out for 4 hours at 80° C. and followed by tempering for 16 hours at 160° C. An opaque cast plate is obtained and its mechanical properties are determined.

COMPARISON EXAMPLE II (not according to the invention)

Production of an epoxide network using an epoxide monomer corresponding to Formula (I) without the thermosetting compositions according to the invention.

240 g of 4-Glycidyloxyphenyl-4-glycidyloxybenzoate and 87 g of 4,4'-diaminodiphenylsulphone are worked up into a cast plate as in Example 6, and this plate is cured for 4 hours at 120° C. and tempered for 16 hours at 160° C. A transparent cast plate is obtained and its mechanical properties are determined.

TABLE 1

Properties of the epoxide resin mouldings from experiments 6, I and II

| Experiment No. | Flexural strength (MPa) | Edge fibre elongation (%) | Martens degree (°C.) | Impact strength (kJ/mm$^2$) |
|---|---|---|---|---|
| 6 | 130 | 8.3 | 171 | 90.5 |
| I* | 112 | 6.7 | 174 | 43.0 |
| II* | 121 | 7.5 | 180 | 35.2 |

*not according to the invention

Examples 6, I and II show that epoxide networks with superstructures and high impact strength are only obtained when the thermosetting compositions according to the invention are used.

Neither the use of the single components of the thermosetting compositions combined with conventional technical epoxide monomers or hardeners nor the production of epoxide networks having superstructures without the aid of the components of the thermosetting mixtures according to the invention are adequate conditions for an epoxide network having a superstructure and high impact strength.

EXAMPLE 7 (Network without superstructure)

252 g of epoxide resin (bisphenol-A bisglycidylether having an epoxide equivalent weight of 180) and 80 g of 3-aminophenyl-4-aminobenzoate (Formula III) were stirred together at 120° C. for 15 minutes. The mixture is degasified by means of a vacuum, cast into a mould and cured for 4 hours at 120° C. and 16 hours at 160° C. A transparent moulded object without any superstructure is obtained. The mechanical data of the moulded object from Example 7 entered in Table 2 show that the thermosetting compositions according to the invention result in hardened epoxide resins which combine high impact strength, rigidity and dimensional stability under heat.

COMPARISON EXAMPLE III 360 g of Epoxide resin (see Example 7) and 114 g of 4-aminophenyl-4-aminobenzoate are worked up and cured as in Example 7. The mechanical data of the moulded object obtained from Comparison Example III entered in Table 2 show that hardened epoxide networks without exceptional impact strength are obtained when rigid, linear diamine hardeners are used.

COMPARISON EXAMPLE IV 313.7 g of Epoxide resin (see Example 7) and 86.3 g of methylene dianiline are worked up and cured as in Example 7. The mechanical data of the moulded object obtained from Comparison Example III to Example 7 entered in Table 2 show that hardened epoxide networks without exceptional impact strength are obtained by using conventional technical kinked diamine hardeners.

TABLE 2

| | Example 7 | Comparison to Example 7 | |
|---|---|---|---|
| | | III | IV |
| Impact strength [kJ/mm$^2$] | 53.6 | 24.6 | 27.0 |
| Flexural strength [N/mm$^2$] | 139.2 | 117.8 | 111.9 |
| Edge fibre elongation [%] | 8.37 | 5.61 | 6.11 |
| Tensile strength [N/mm$^2$] | 87.8 | — | — |
| Elongation under tension [%] | 5.9 | — | — |
| E-Modulus [N/mm$^2$] | 3060 | 3028 | 2745 |
| Dimensional stability under heat according to Martens [°C.] | 159 | 160 | 147 |
| Glass transition temperature [°C.] | 173 | 169 | 166 |

We claim:

1. Thermosetting compositions suitable for the production of superstructure epoxide networks comprising:
   a) an epoxide-containing component comprising 4-glycidyloxyphenyl-4-glycidyloxybenzoate; and
   b) an epoxide-reactive component selected from the group consisting of 3-aminophenyl-4-aminobenzoate and 3-aminophenyl-3-aminobenzoate.

2. A process for preparing epoxide networks having superstructures and high impact strength, comprising curing the composition of claim 1 at a temperature of 60° to 250° C., wherein curing is optionally interrupted by cooling to a temperature below 60° C. and is subsequently continued by reheating to a temperature of 60° to 250° C.

3. The process of claim 2, wherein the curing temperature is 80° to 160° C.

4. Electrical or chip insulation material prepared from the composition of claim 1.

5. High performance, fiber-containing composites prepared from the composition of claim 1.

* * * * *